US012570267B2

(12) United States Patent
Park et al.

(10) Patent No.: US 12,570,267 B2
(45) Date of Patent: Mar. 10, 2026

(54) HYBRID VEHICLE AND A METHOD OF CONTROLLING THE SAME

(71) Applicants: HYUNDAI MOTOR COMPANY, Seoul (KR); KIA CORPORATION, Seoul (KR)

(72) Inventors: Jungsoo Park, Incheon (KR); Kai Qiang Yu, Yantai (CN); Tae Hun Jung, Seoul (KR); Xiao Rui Zhai, Yantai (CN)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 159 days.

(21) Appl. No.: 18/505,718

(22) Filed: Nov. 9, 2023

(65) Prior Publication Data

US 2025/0083658 A1      Mar. 13, 2025

(30) Foreign Application Priority Data

Sep. 8, 2023     (CN) .......................... 202311155774.7

(51) Int. Cl.
| | |
|---|---|
| *B60W 20/10* | (2016.01) |
| *B60K 6/40* | (2007.10) |
| *B60W 10/06* | (2006.01) |
| *B60W 30/182* | (2020.01) |

(52) U.S. Cl.
CPC .............. *B60W 20/10* (2013.01); *B60K 6/40* (2013.01); *B60W 10/06* (2013.01); *B60W 30/182* (2013.01); *B60W 2510/0676* (2013.01); *B60W 2510/244* (2013.01); *B60W 2540/10* (2013.01); *B60W 2710/0666* (2013.01); *B60Y 2200/92* (2013.01)

(58) Field of Classification Search
CPC .... B60W 20/10; B60W 10/06; B60W 30/182; B60W 2510/0676; B60W 2510/244; B60W 2540/10; B60W 2710/0666; B60W 10/08; B60W 20/15; B60W 10/26; B60W 40/02; B60W 2510/0657; B60K 6/40; B60Y 2200/92; Y02T 10/62; B60H 1/004; B60H 1/00764; B60H 1/00807
See application file for complete search history.

(56) References Cited

U.S. PATENT DOCUMENTS

| | | | |
|---|---|---|---|
| 2016/0159339 A1* | 6/2016 | Cho ........................ | B60K 6/442 180/65.265 |
| 2022/0410867 A1* | 12/2022 | Shin ........................ | B60K 6/48 |

* cited by examiner

*Primary Examiner* — Brian P Sweeney
(74) *Attorney, Agent, or Firm* — Lempia Summerfield Katz LLC

(57)      ABSTRACT

A hybrid vehicle includes an engine configured to generate power for driving the vehicle by combustion of fuel. The hybrid vehicle also includes a drive motor configured to generate another power for driving the vehicle and selectively generate electrical energy by operating as a generator. The hybrid vehicle also includes a battery configured to supply electrical energy to the drive motor or to be charged by the electrical energy generated by the drive motor. The hybrid vehicle also includes the controller configured to control an operation of the engine by using different torque maps based on a driver's requested torque, a state of charge (SOC) of the battery, a drive mode of the vehicle, an operation state of a full automatic temperature controller (FATC), and a coolant temperature.

10 Claims, 4 Drawing Sheets

HYBRID VEHICLE AND A METHOD OF CONTROLLING THE SAME

CROSS-REFERENCE TO RELATED APPLICATION

This application claims priority to and the benefit of Chinese Patent Application No. 202311155774.7 filed in the Chinese National Intellectual Property Administration on Sep. 8, 2023, the entire contents of which are incorporated herein by reference.

TECHNICAL FIELD

The present disclosure relates to a hybrid vehicle and a method of controlling the same, and more particularly, the present disclosure relates to a hybrid vehicle and a method of controlling the same capable of enhancing heating performance in a low-load driving of the vehicle.

BACKGROUND

A hybrid vehicle is a vehicle using two or more power sources and generally refers to a hybrid electric vehicle driven using an engine and a motor. A hybrid electric vehicle may take various forms, using two or more power sources, including an engine and a motor.

In general, a hybrid electric vehicle uses a powertrain in a manner of a Transmission Mounted Electronic Device (TMED), in which a drive motor, a transmission, and a drive shaft are connected in series to each other.

In addition, a clutch is disposed between an engine and a motor, and the hybrid electric vehicle is driven in an electric vehicle (EV) mode, in a hybrid electric vehicle (HEV) mode, or in an engine single mode, depending on whether the clutch is engaged. The EV mode is a mode in which a vehicle is driven only by driving torque of a drive motor, the HEV mode is a mode in which the vehicle is driven by driving torque of the drive motor and the engine, and the engine mode is a mode in which the vehicle is driven only by driving torque of the engine.

In the case of a hybrid vehicle, the engine is turned on to heat the vehicle interior in a cold driving situation where the battery's state of charge (SOC) is high, the outside air temperature is low, and the coolant temperature is low. At this time, since the SOC is high, an engine torque corresponding to the driver's requested torque is output, and the SOC of the battery gradually decreases due to power consumption in electrical components of the vehicle. However, there may be a situation where it becomes challenging to provide enough heat to warm the interior of the vehicle because the driver's requested torque is low and the driving load is low. Although the vehicle interior may be heated by the electric heater, there is a problem in that the battery is rapidly discharged since the efficiency of the electric heater is very low.

In other words, the engine is turned on or off based on an operation strategy of the SOC in a region where the SOC of the battery is high. Therefore, it may be difficult to secure a heat source (e.g., enough heat) for heating the vehicle interior because sufficient engine torque cannot be output when the vehicle is running at a cold and low load condition.

The above information disclosed in this Background section is only for enhancement of understanding of the background of the disclosure, and therefore it may contain information that does not form the prior art that is already known to a person of ordinary skill in the art.

SUMMARY

The present disclosure provides a hybrid vehicle and a method of controlling the same capable of securing a heat source for heating the vehicle interior when a hybrid vehicle is driven in a cold and low-load condition in a high state of charge (SOC) region of the battery.

A hybrid vehicle includes an engine configured to generate power for driving the vehicle by combustion of fuel. The hybrid vehicle also includes a drive motor configured to generate another power for driving the vehicle and selectively generate electrical energy by operating as a generator, The hybrid vehicle also includes a battery configured to supply electrical energy to the drive motor or to be charged by the electrical energy generated by the drive motor. The hybrid vehicle also includes the controller configured to control an operation of the engine by using different torque maps based on a driver's requested torque, a state of charge (SOC) of the battery, a drive mode of the vehicle, an operation state of a full automatic temperature controller (FATC), and a coolant temperature.

When a SOC of the battery is in a normal high region, the drive mode may be a mode other than a sport mode, and the full automatic temperature controller may be in an OFF-state, the controller may be configured to control the engine through first torque map to satisfy the driver's requested torque.

When the SOC of the battery is in the normal high region and the drive mode is the sport mode, the controller may be configured to control the engine through second torque map to satisfy the driver's requested torque.

When the SOC of the battery is in the normal high region, the drive mode is a mode other than the sport mode, the full automatic temperature controller is in an ON-state, and a cold and low-load condition is met, the engine may be controlled through a larger value of the second torque map and the third torque map to satisfy the driver's requested torque.

The cold and low-load driving condition may be met when the driver's requested torque is below a predetermined torque and the coolant temperature is below a predetermined temperature.

In another embodiment of the present disclosure, a method of controlling a hybrid a vehicle includes: determining a state of charge (SOC) of a battery, determining the drive mode of the vehicle, and determining an operation state of a full automatic temperature controller (FATC). The method further includes controlling an operation of an engine by using different torque maps based on a driver's requested torque, the state of charge (SOC) of the battery, the drive mode of the vehicle, the operation state of the full automatic temperature controller (FATC), and a coolant temperature.

The engine may be controlled through a first torque map, when a SOC of the battery is in a normal high region, the drive mode is a mode other than a sport mode, and the full automatic temperature controller is in an OFF-state.

The engine may be controlled through a second torque map, when the SOC of the battery is in the normal high region, the drive mode is the sport mode.

The engine may be controlled through a larger value of the second torque map and the third torque map when the SOC of the battery is in the normal high region, the drive mode is a mode other than the sport mode, the full automatic temperature controller is in an ON-state, and a cold and low-load condition is met.

The cold and low-load driving condition may be met when the driver's requested torque is below a predetermined torque and the coolant temperature is below a predetermined temperature.

According to a hybrid vehicle according to the present disclosure, when the SOC of battery is in the normal high region, by controlling the engine torque through a separate torque map depending on the drive mode of the vehicle and on/off of the full automatic temperature controller, the engine torque may be more precisely controlled and the heating performance of the vehicle may be enhanced, when the vehicle is running in a cold and low-load condition.

Other effects that may be obtained or are predicted by an embodiment are explicitly or implicitly described in a detailed description of the present disclosure. In other words, various effects that are predicted according to an embodiment are described in the following detailed description.

BRIEF DESCRIPTION OF THE DRAWINGS

These drawings are for reference only in describing embodiments of the present disclosure, and therefore the technical idea of the present disclosure should not be limited to the accompanying drawings.

Figure 1:
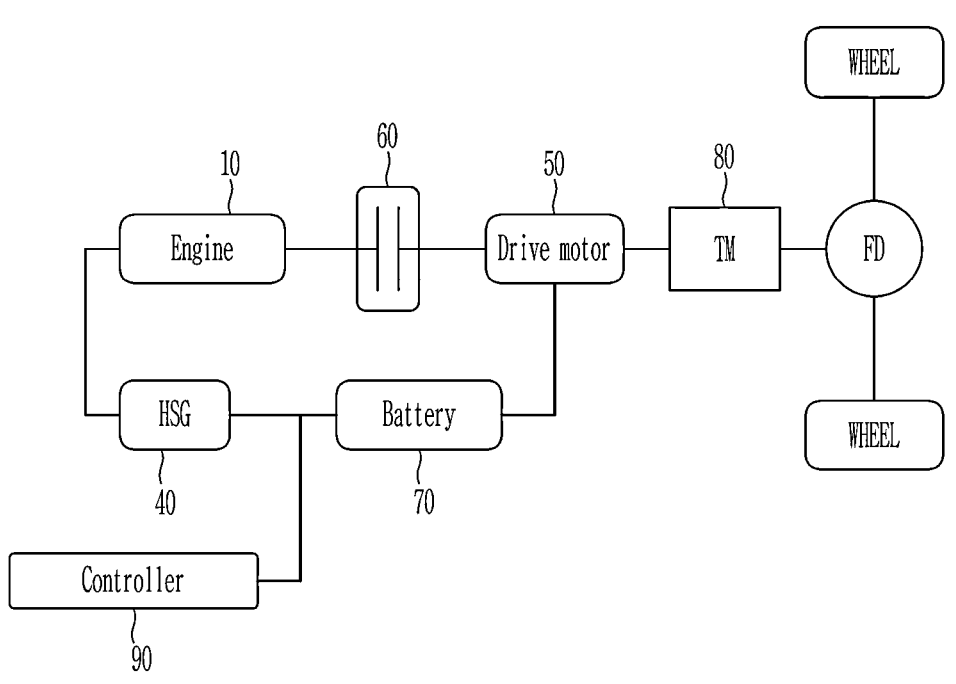
FIG. 1 is a schematic view showing configuration of a hybrid vehicle according to one embodiment of the present disclosure.

It should be understood that the above-referenced drawings are not necessarily to scale, presenting a somewhat simplified representation of various features illustrating the basic principles of the disclosure. The specific design features of the present disclosure, including, for example, specific dimensions, orientations, locations, and shapes, should be determined in part by the particular intended application and use environment.

DETAILED DESCRIPTION

The terminology used herein is for the purpose of describing particular embodiments only and is not intended to limit the present disclosure. As used herein, the singular forms are intended to include the plural forms as well, unless the context clearly indicates otherwise. As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items.

Additionally, it should be understood that one or more of the methods below or aspects thereof may be executed by at least one controller. The term "controller" may refer to a hardware device that includes a memory and a processor.

The memory is configured to store program instructions, and the processor is specifically programmed to execute the program instructions to perform one or more processes which are described further below. The controller may control operation of units, modules, parts, devices, or the like, as described herein. Moreover, it should be understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMS, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The present disclosure is described more fully hereinafter with reference to the accompanying drawings, in which the present disclosure are shown. As those having ordinary skill in the art should realize, the described embodiments may be modified in various different ways, all without departing from the spirit or scope of the present disclosure.

The drawings and description should be regarded as illustrative in nature and not restrictive, and like reference numerals designate like elements throughout the specification.

In addition, the size and thickness of each configuration shown in the drawings are arbitrarily shown for understanding and ease of description, but the present disclosure is not limited thereto. In order to clearly illustrate several portions and regions, thicknesses thereof are increased.

The terms "module" and "unit" for components used in the following description are used only in order to make the specification easier. Therefore, these terms do not have meanings or roles that distinguish them from each other by themselves.

In describing embodiments of the present specification, when it is determined that a detailed description of the well-known art associated with the present disclosure may obscure the gist of the present disclosure, it will be omitted.

The accompanying drawings are provided only in order to allow embodiments disclosed in the present specification to be easily understood and should not be interpreted as limiting the spirit disclosed in the present disclosure. It should be understood that the present disclosure includes all modifications, equivalents, and substitutions without departing from the scope and spirit of the present disclosure.

Terms including ordinal numbers, such as first, second, and the like, are used only to describe various components and should not be interpreted as limiting these components. When a component, device, element, or the like of the present disclosure is described as having a purpose or performing an operation, function, or the like, the component, device, or element should be considered herein as being "configured to" meet that purpose or to perform that operation or function.

As used herein, the singular forms "a", "an", and "the" are intended to include the plural forms as well, unless the context clearly indicates otherwise.

The terms are only used to differentiate one component from others.

It should be understood that when one component is referred to as being "connected" or "coupled" to another component, it may be connected or coupled directly to another component or be connected or coupled to another component with the other component intervening therebetween.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

Hereinafter, a hybrid vehicle according to the present disclosure is described in detail with reference to the drawings.

FIG. 1 is a schematic view showing configuration of a hybrid vehicle according to the present disclosure. In addition, FIG. 2 is a block diagram showing configuration of a hybrid vehicle according to the present disclosure.

The hybrid vehicle according to the embodiment of the present disclosure is described below based on a structure of a transmission mounted electric device (TMED) scheme as an example. However, the scope of the present disclosure is not limited thereto, and the present disclosure may be applied to hybrid electric vehicles in other schemes as a matter of course.

Figure 2:
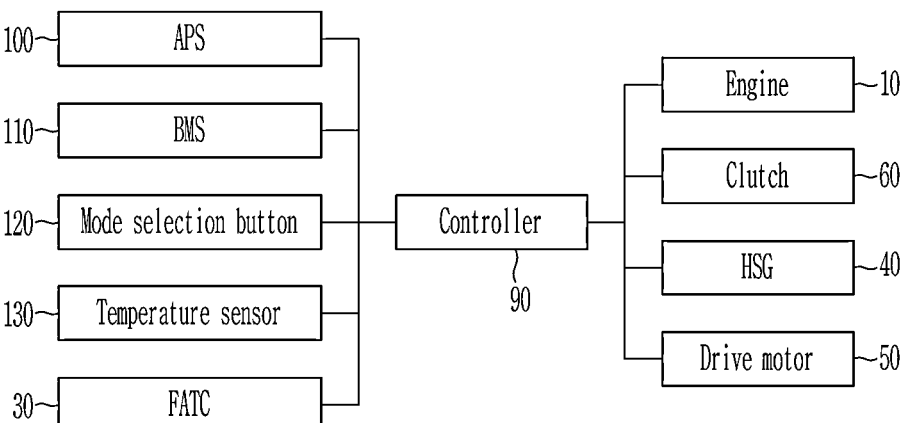
FIG. 2 is a block diagram showing configuration of a hybrid vehicle according to one embodiment of the present disclosure.

According to an embodiment of the present disclosure, as shown in FIG. 1 and FIG. 2, a hybrid vehicle may include an engine 10, a hybrid starter and generator (HSG) 40, a drive motor 50, a clutch 60, a battery 70, an accelerator pedal sensor, and a controller 90.

The engine 10 generates power required for driving of the vehicle through combustion of fossil fuel.

The HSG 40 may start the engine 10 and may generate electrical energy by selectively operating as a generator after the engine 10 is started.

The drive motor 50 assists power of the engine 10 and selectively operates as a power generator to generate electric energy.

The HSG 40 and the drive motor 50 are operated by using electric energy in the battery 70, and the electric energy generated by the drive motor 50 and the HSG 40 is charged in the battery 70.

Figure 3:
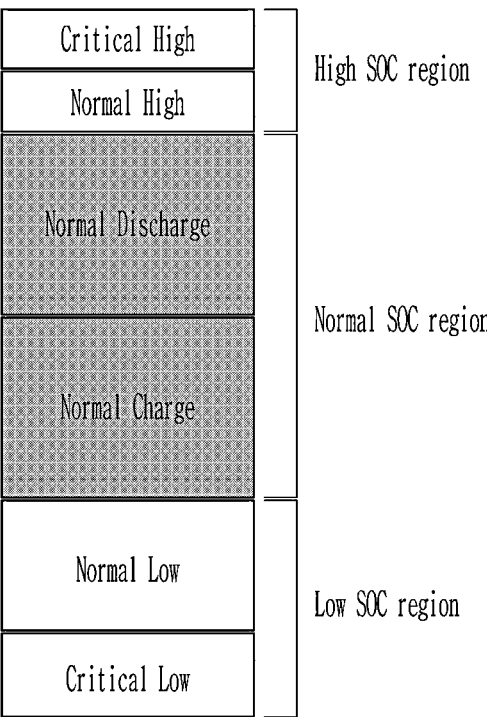
FIG. 3 is a drawing showing state of charge (SOC) region of a hybrid vehicle according to one embodiment of the present disclosure.

A state of charge (SOC) indicating a charged state of the battery 70 may be divided into three regions. Referring to FIG. 3, SOC of the battery 70 may be divided into a high SOC region, a normal SOC region, and a low SOC region, depending on a charged level of the battery 70.

In addition, depending on the charged level of the battery 70, the high region may be divided into a critical high region (CH) and a normal high region (NH), the normal region may be divided into a normal discharge region (ND) and a normal charge region (NC), and the low region may be divided into a normal low region (NL) and a critical low region (CL).

The SOC of the battery 70 is managed by a battery management system (BMS), and the information about the SOC of the battery 70 is transmitted to the controller 90.

The accelerator pedal sensor (APS) is configured to detect the driver's operation amount of the accelerator pedal. The operation amount of the accelerator pedal detected by the accelerator pedal sensor is transmitted to the controller 90. The controller 90 may determine a driver's requested torque corresponding to the driver's acceleration intention determined based on the operation amount of the accelerator pedal detected by the accelerator pedal sensor.

The clutch 60 is provided between the engine 10 and the drive motor 50, and the hybrid vehicle is operated in the engine mode, the electric vehicle (EV) mode, or the hybrid electric vehicle (HEV) mode according to the coupling of the clutch 60. The EV mode is a mode in which a vehicle is driven by only driving torque of a drive motor, the HEV mode is a mode in which the vehicle is driven by driving torque of the drive motor and the engine 10, and the engine mode is a mode in which the vehicle is driven by only driving torque of the engine 10.

The driving power output from the engine 10 and the drive motor 50 is transferred to the drive wheels provided in the vehicle. At this time, a transmission (TM) 80 is provided between the clutch 60 and the drive wheels. A shifting gear is installed inside the transmission 80, so that torque output from the engine 10 and the drive motor 50 is changed according to a shifting gear stage.

A full automatic temperature controller (FATC) is configured to control a vehicle interior temperature by adjusting an air-conditioner apparatus provided in the vehicle. When an occupant of the vehicle turns on the full automatic temperature controller, the full automatic temperature controller controls the air-conditioner apparatus to follow the temperature set by the occupant.

The air-conditioner apparatus may be configured such that, while a heat-exchange medium output by the operation of the compressor is circulated to a condenser, a receiver drier, an expansion valve, an evaporator, and then back to the compressor, the vehicle interior may be cooled by heat-exchange by the evaporator, or the vehicle interior may be heated by flowing the coolant cooling the engine 10 or the drive motor 50 into the heater and performing heat-exchange.

The hybrid vehicle is provided with various electrical components, and the electrical components consumes the electrical energy of the battery. For example, the electrical components may include a drive motor, an inverter, an electric heater, the air-conditioner apparatus, and the like.

The controller 90 is configured to control components of the vehicle including the engine 10, the HSG 40, the drive motor 50, the battery 70, and the clutch 60.

For such a purpose, the controller 90 may be implemented as at least one processor operated by a predetermined program, program instructions programed to perform each step of a method of controlling the vehicle provided with a motor through at least one processor are stored in a memory of the controller.

Meanwhile, the hybrid vehicle may include a plurality of drive modes. The drive mode of the hybrid vehicle may include an eco mode (i.e., fuel efficiency mode), a normal mode, a snow mode, a comfort mode, and a sport mode.

The eco mode is a drive mode for realizing high fuel efficiency (or electricity efficiency) and refers to a drive mode in which an engine speed at which gear is shifted is lower than that of a general drive mode. The sport mode is a mode for improving acceleration performance of the vehicle and refers to a drive mode in which the vehicle uses a high driving speed. The snow mode refers to a drive mode that prevents the vehicle from slipping on slippery roads such as snowy roads. The comfort mode refers to a drive mode in which vehicle occupants feel comfortable and noise is reduced to maximize riding comfort. In addition, the normal mode refers to a drive mode of the vehicle other than special modes such as the eco mode, the sport mode, the snow mode, and the comfort mode.

The driver (or the occupant) may select the drive mode of the vehicle by manipulating a mode selection button 120 provided in the vehicle.

According to one embodiment of the present disclosure, a hybrid vehicle includes a temperature sensor 130 configured to detect a temperature of the coolant for cooling the engine 10 or the drive motor 50, and a coolant temperature detected by the temperature sensor 130 is transmitted to the controller 90.

Hereinafter, a method of controlling a hybrid vehicle according to an embodiment of the present disclosure is described in detail with reference to the drawings.

Figure 4:
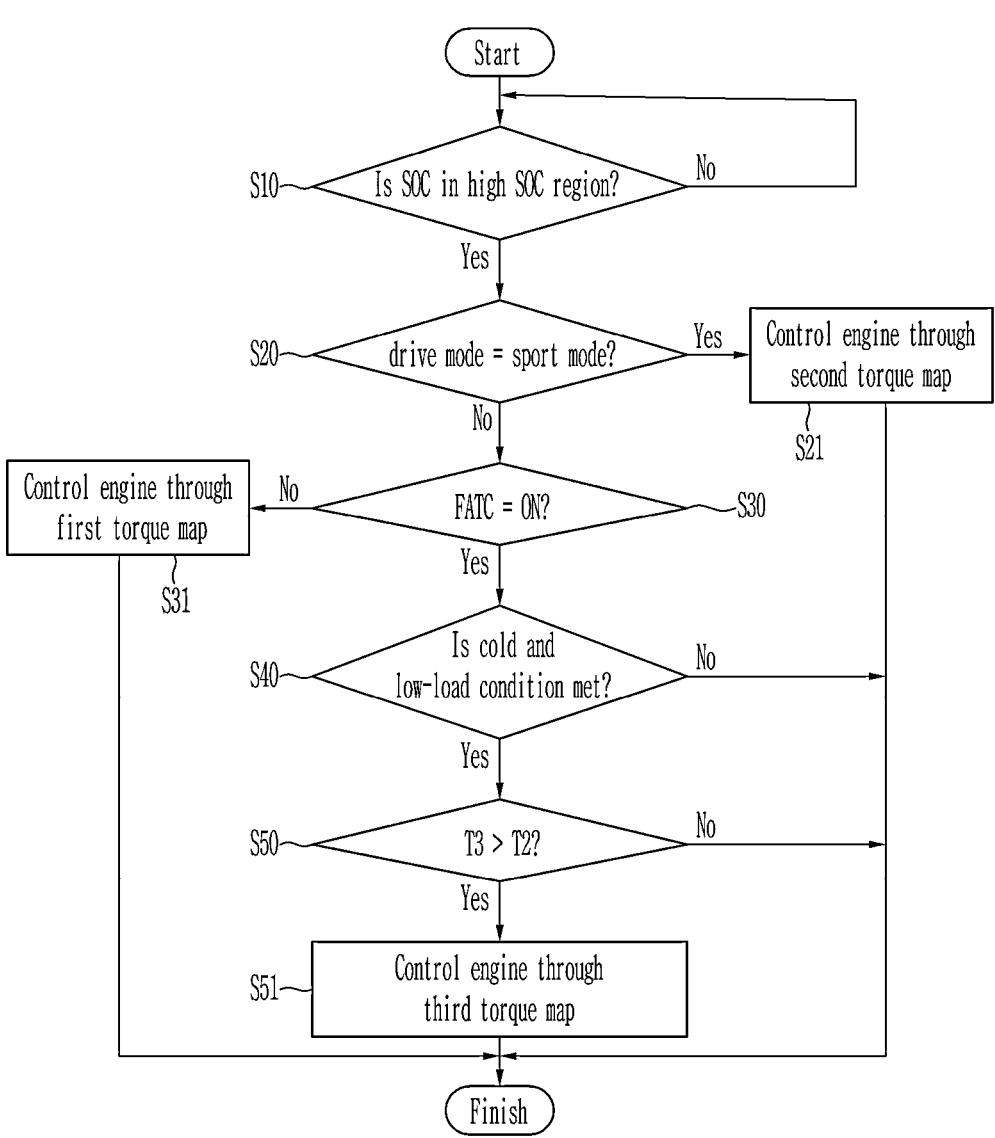
FIG. 4 is a flowchart showing a method of controlling a hybrid vehicle according to one embodiment of the present disclosure.

FIG. 4 is a flowchart showing a method of controlling a hybrid vehicle according to one embodiment of the present disclosure.

Referring to FIG. 4, at step S10, the controller 90 determines the SOC of the battery 70 transmitted from the battery management system.

When the SOC of the battery 70 is in the high region at the step S10 (Yes in step S10), the controller 90 determines whether the drive mode of the hybrid vehicle is the sport mode, at step S20.

When the drive mode of the hybrid vehicle is a drive mode other than the sport mode (e.g., the eco mode or the normal mode) at the step S20 (No in step S20), the controller 90 determines whether the full automatic temperature controller is an ON-state, at step S30.

When the drive mode of the hybrid vehicle is a drive mode other than the sport mode (e.g., the eco mode or the normal mode) and the full automatic temperature controller is an OFF-state (No in step S30), the controller 90 outputs the driver's requested torque by outputting the engine torque by using a first torque map, at step S31. At this time, the engine torque output through the first torque map may be determined based on the driver's requested torque and the engine speed (e.g., rpm). The engine torque output through the first torque map may be an engine torque output in a region lower than an optimal operating line (OOL) of the engine.

When the drive mode of the hybrid vehicle is the sport mode at the step S20 (Yes in step S20), the controller 90 outputs the driver's requested torque by outputting the engine torque by using a second torque map, at step S21. At this time, the engine torque output through the second torque map may be determined based on the driver's requested torque, the engine speed, and the SOC.

When the full automatic temperature controller is the ON-state at the step S30 (Yes in step S30), the controller 90 determines whether a cold and low-load driving condition is met, at step S40.

The cold and low-load driving condition may be met when the driver's requested torque is below predetermined torque (e.g., 100 Nm), the coolant temperature is below a predetermined temperature (e.g., Celsius 40 degrees), the SOC of the battery 70 is in the normal high region in the high region.

A cold driving condition may be determined based on the coolant temperature, and a low-load driving condition may be determined based on the driver's requested torque. When the SOC of battery is in the critical high region, rapid discharging of the battery 70 is prioritized. Therefore, when the SOC is in the critical high region, the hybrid vehicle may be driven mainly in the EV mode. The EV mode is a mode in which the driving force output by the engine is not involved in the driving of the vehicle. In the EV mode, the engine may be turned off such that the vehicle travels only by the driving force of the driving motor 50, or the engine is driven may be driven (e.g., at an idling speed) but the clutch 60 is disengaged such that the vehicle travels only by the driving force of the driving motor 50.

When a cold and low-load condition is met at step S40 (Yes in step S40), an engine torque T2 determined through the second torque map and an engine torque T3 determined through a third torque map are compared at step S50, and a larger value of the engine torque T2 determined through the second torque map and the engine torque T3 determined through the third torque map is determined as the engine torque. In other words, at step S51, the controller 90 controls the engine by the larger value of the engine torque T2 determined through the second torque map and the engine torque T3 determined through the third torque map. The engine torque output through the third torque map may be determined based on the driver's requested torque, power consumption amount of electrical component load, the coolant temperature and the SOC.

Concepts of the second torque map and the third torque map are basically similar to each other in terms of managing the SOC in the low-load region. Specifically, the second torque map used when the drive mode of the vehicle is the sports mode has a long period in which the engine is turned on because the performance of the vehicle is important, and the third torque map in consideration of the electrical load also has a long period in which the engine is turned on, for heating of the vehicle interior. Therefore, in the low-load (or low-torque) region where the driver's requested torque is small, the engine may be controlled by using a larger value of an engine torque by the third torque map considering heating of the vehicle interior and an engine torque by the second torque map considering the vehicle dynamic performance. In other words, by comparing the engine torque by the second torque map and the engine torque by the third torque map having similar characteristics and then by controlling the engine using a larger value, the diversity for determining the engine torque may be increased, and the heating performance of the vehicle may be enhanced.

The driver's requested torque (or, requested load) is in the intermediate load (or, intermediate torque) and the high load (or, high torque) region, engine torques determined by the first torque map, the second torque map, and the third torque map are similar.

However, when the driver's requested torque (or, requested load) is in the low-load (or, low torque) region, the engine torque determined by the first torque map is substantially similar to the engine torque determined by the third torque map, or tend to be slightly larger. In addition, the engine torque determined by the third torque map tends to be greater than the engine torque determined by the second torque map but is not necessarily limited thereto.

In addition, the engine torque determined by each torque map (first torque map to third torque map) cannot exceed the sum of the driver's requested torque and the torque required by electric components. At this time, when the vehicle interior temperature reaches the temperature set by the driver (or occupant) by the air-conditioner apparatus, the engine torque determined by the second torque map and the engine torque determined by the third torque map become substantially the same.

According to a hybrid vehicle and a method of controlling the same according to the present disclosure, when the cold and low-load driving condition is met while the SOC of battery is in the normal high region, the engine torque is determined in consideration of the coolant temperature, a power consumption amount of the electrical components, or the SOC, and thereby the heating performance of the vehicle may be enhanced. In other words, when the vehicle is running in the cold and low-load condition, the engine torque is determined by using a new engine torque map (e.g., the third torque map of present disclosure) considering the driver's requested torque, the coolant temperature, the power consumption amount of the electrical components, and the SOC, such that the coolant temperature may be rapidly increased and thereby the heating performance of the vehicle may be enhanced.

In addition, when the SOC of battery is in the normal high region, by controlling the engine torque through a separate torque map depending on the drive mode of the vehicle and on/off of the full automatic temperature controller, the engine torque may be more precisely controlled when the vehicle is running in the cold and low-load condition.

While this disclosure has been described in connection with what is presently considered to be practical embodiments, it should be understood that the disclosure is not limited to the disclosed embodiments. On the contrary, the present disclosure is intended to cover various modifications and equivalent arrangements included within the spirit and scope of the appended claims.

DESCRIPTION OF SYMBOLS

10: engine
11: combustion chamber
30: the full automatic temperature controller
40: HSG
50: drive motor
60: clutch
70: battery
80: transmission
90: controller
100: APS
110: BMS
120: mode selection button
130: temperature sensor

What is claimed is:

1. A hybrid vehicle, comprising:
an engine configured to generate power for driving the vehicle by combustion of fuel;
a drive motor configured to generate another power for driving the vehicle and selectively generate electrical energy by operating as a generator;
a battery configured to supply electrical energy to the drive motor or to be charged by the electrical energy generated by the drive motor; and
a controller configured to control an operation of the engine by using any one among a first torque map, a second torque map, and a third torque map based on a driver's requested torque, a state of charge (SOC) of the battery, a drive mode of the vehicle, an operation state of a full automatic temperature controller (FATC), and a coolant temperature.

2. The hybrid vehicle of claim 1, wherein, when the SOC of the battery is in a normal high region, the drive mode is a mode other than a sport mode, and the FATC is in an OFF-state, the controller is configured to control the engine through the first torque map to satisfy the driver's requested torque.

3. The hybrid vehicle of claim 2, wherein, when the SOC of the battery is in the normal high region and the drive mode is the sport mode, the controller is configured to control the engine through the second torque map to satisfy the driver's requested torque.

4. The hybrid vehicle of claim 3, wherein, when the SOC of the battery is in the normal high region, the drive mode is a mode other than the sport mode, the FATC is in an ON-state, and a cold and low-load condition is met, the engine is controlled through a larger value of an engine torque determined through the second torque map and an engine torque determined through the third torque map to satisfy the driver's requested torque.

5. The hybrid vehicle of claim 4, wherein the cold and low-load driving condition is met when the driver's requested torque is below a predetermined torque and the coolant temperature is below a predetermined temperature.

6. A method of controlling a hybrid a vehicle, the method comprising:
determining a state of charge (SOC) of a battery;
determining a drive mode of the vehicle;
determining an operation state of a full automatic temperature controller (FATC); and
controlling an operation of an engine by using any one among a first torque map, a second torque map, and a third torque map based on a driver's requested torque, the SOC of the battery, the drive mode of the vehicle, the operation state of the FATC, and a coolant temperature.

7. The method of claim 6, wherein the engine is controlled through the first torque map when the SOC of the battery is in a normal high region, the drive mode is a mode other than a sport mode, and the FATC is in an OFF-state.

8. The method of claim 7, wherein the engine is controlled through the second torque map when the SOC of the battery is in the normal high region and the drive mode is the sport mode.

9. The method of claim 8, wherein the engine is controlled through a larger value of an engine torque determined through the second torque map and an engine torque determined through the third torque map when the SOC of the battery is in the normal high region, the drive mode is a drive mode other than the sport mode, the FATC is in an ON-state, and a cold and low-load condition is met.

10. The method of claim 9, wherein the cold and low-load driving condition is met when the driver's requested torque is below a predetermined torque and the coolant temperature is below a predetermined temperature.

* * * * *